United States Patent
Stadelmeier et al.

(10) Patent No.: US 8,711,953 B2
(45) Date of Patent: Apr. 29, 2014

(54) METHOD FOR TRANSMITTING A SIGNAL FROM A TRANSMITTER TO A RECEIVER IN A POWER LINE COMMUNICATION NETWORK, TRANSMITTER, RECEIVER, POWER LINE COMMUNICATION MODEM AND POWER LINE COMMUNICATION SYSTEM

(71) Applicant: Sony Corporation, Tokyo (JP)

(72) Inventors: Lothar Stadelmeier, Stuttgart (DE); Dietmar Schill, Winnenden (DE); Andreas Schwager, Kernen (DE); Daniel Schneider, Stuttgart (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/943,172

(22) Filed: Jul. 16, 2013

(65) Prior Publication Data

US 2013/0301744 A1 Nov. 14, 2013

Related U.S. Application Data

(63) Continuation of application No. 13/601,697, filed on Aug. 31, 2012, which is a continuation of application No. 13/556,572, filed on Jul. 24, 2012, now Pat. No. 8,406,329, which is a continuation of application No. 12/145,992, filed on Jun. 25, 2008, now Pat. No. 8,270,505.

(30) Foreign Application Priority Data

Jul. 23, 2007 (EP) .................... 07014436

(51) Int. Cl.
*H04B 3/00* (2006.01)

(52) U.S. Cl.
USPC ............ 375/257; 375/267; 375/320; 375/298

(58) Field of Classification Search
CPC ................. H04B 7/0897; H04B 7/086; G10K 2210/3215
USPC ........................................................ 375/257
See application file for complete search history.

(56) References Cited

U.S. PATENT DOCUMENTS 5,583,967 A 12/1996 Akagiri
6,812,873 B1 11/2004 Siohan et al.
(Continued)

FOREIGN PATENT DOCUMENTS

CN 101536389 9/2009
EP 1 643 658 A1 4/2006
(Continued)

OTHER PUBLICATIONS

Jinho Choi, et al. "Eigenbeamforming with Selection Diversity for MIMO-OFDM Downlink", Vehicular Technology Conference, 2004 IEEE, XP010786948, Sep. 26, 2004, pp. 1806-1810.

(Continued)

*Primary Examiner* — Lihong Yu
(74) *Attorney, Agent, or Firm* — Oblon, Spivak, McClelland, Maier & Neustadt, L.L.P.

(57) ABSTRACT

A method for transmitting a signal from a transmitter over a channel to a receiver on a Power Line Network, wherein said signal is OFDM-modulated on a set of sub-carriers, is proposed, wherein an OFDM tonemap and an eigenbeamforming encoding matrix are determined based on a channel estimation for each sub-carrier, a tonemap feedback signal and an eigenbeamforming feedback signal are generated, which are descriptive of said OFDM tonemap and said eigenbeamforming encoding matrix, respectively, and transmitted to the transmitter. A corresponding receiver, a transmitter, a power line communication and a power line communication system are described as well.

15 Claims, 9 Drawing Sheets

(56) References Cited

U.S. PATENT DOCUMENTS

| | | |
|---|---|---|
| 6,904,283 B2 | 6/2005 | Li et al. |
| 7,236,748 B2 | 6/2007 | Li et al. |
| 7,406,120 B1 | 7/2008 | Schmidt et al. |
| 7,542,454 B2 | 6/2009 | Lin et al. |
| 7,555,661 B2 * | 6/2009 | Luu .............................. 713/320 |
| 7,570,696 B2 | 8/2009 | Maltsev et al. |
| 7,933,366 B2 | 4/2011 | Liu |
| 8,270,505 B2 | 9/2012 | Stadelmeier et al. |
| 8,509,333 B2 * | 8/2013 | Stadelmeier et al. ......... 375/260 |
| 2004/0253960 A1 | 12/2004 | Nguyen et al. |
| 2007/0143558 A1 | 6/2007 | Tseytin |
| 2007/0177683 A1 | 8/2007 | Matsushita et al. |
| 2007/0254597 A1 | 11/2007 | Li et al. |
| 2007/0293172 A1 | 12/2007 | Shi et al. |
| 2009/0285325 A1 | 11/2009 | Zhou |

FOREIGN PATENT DOCUMENTS

| | | |
|---|---|---|
| EP | 2 086 140 | 8/2009 |
| WO | WO 2006/102639 A1 | 9/2006 |
| WO | WO 2008/062587 | 5/2008 |

OTHER PUBLICATIONS

Carlos Lopez Giovaneli, et al., "Space-Frequency Coded OFDM System for Multi-Wire Power Line Communications", Power Line Communications and Its Applications, IEEE, XP-002433844, Apr. 6, 2005, pp. 191-195.

Lin Hao, et al., "A MIMO-OFDM Scheme over Coupled Multi-conductor Power-Line Communication Channel", Power Line Communications and Its Applications, IEEE, XP-002462910, Mar. 28, 2007 pp. 198-203.

Extended European Search Report issued Oct. 17, 2011, in European Patent Application No. 11004786.7.

* cited by examiner

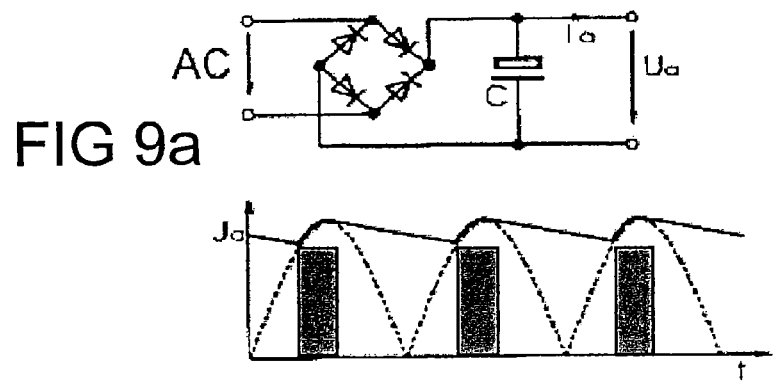
FIG 9a
FIG 9b
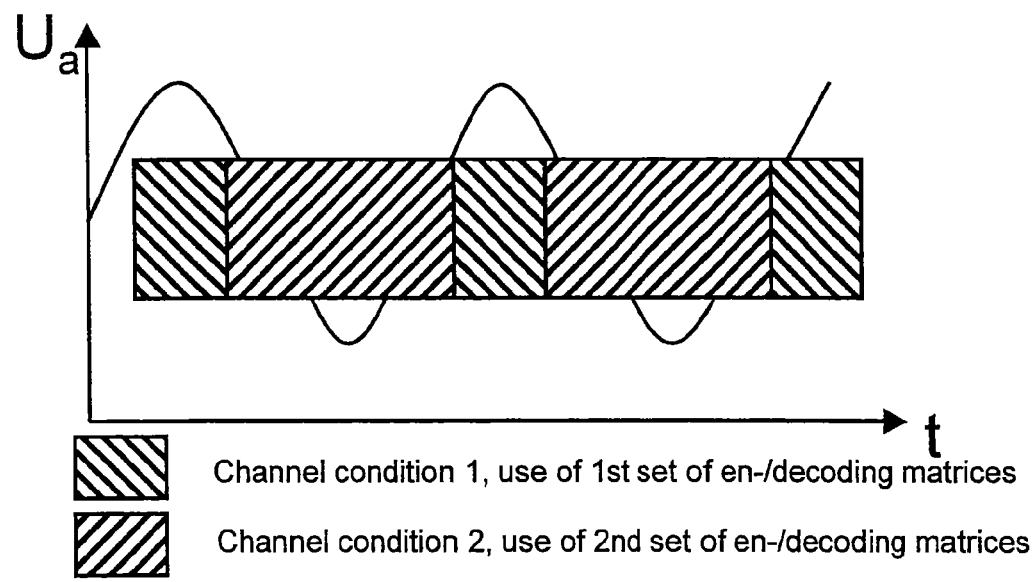
Channel condition 1, use of 1st set of en-/decoding matrices
Channel condition 2, use of 2nd set of en-/decoding matrices
FIG 9c

METHOD FOR TRANSMITTING A SIGNAL FROM A TRANSMITTER TO A RECEIVER IN A POWER LINE COMMUNICATION NETWORK, TRANSMITTER, RECEIVER, POWER LINE COMMUNICATION MODEM AND POWER LINE COMMUNICATION SYSTEM

CROSS-REFERENCE TO RELATED APPLICATIONS

The present is a continuation application of and claims the benefit of priority under 35 U.S.C. §120 from U.S. application Ser. No. 13/601,697, filed Aug. 31, 2012, which is a continuation application of U.S. application Ser. No. 13/556,572, filed Jul. 24, 2012, now U.S. Pat. No. 8,406,329, which is a continuation application of U.S. application Ser. No. 12/145,992, filed Jun. 25, 2008, now U.S. Pat. No. 8,270,505, the entire contents of each of which is incorporated herein by reference, and is based upon and claims the benefit of priority under 35 U.S.C. §119 from European Patent Application No. 07014436.5, filed Jul. 23, 2007.

The invention relates to a method for transmitting a signal from a transmitter to a receiver in a powerline communication network and to a corresponding transmitter and a corresponding receiver. The invention also relates to a power line communication modem and a power line communication system.

BACKGROUND

Power line communication (PLC), also called Mains Communication, Power Line Transmission (PLT), Broadband Powerline (BPL), Powerband or Power Line Networking (PLN), is a term describing several different systems for using power distribution wires for simultaneous distribution of data. A carrier can communicate voice and data by superimposing an analog signal over the standard 50 Hz or 60 Hz alternating current (AC). For indoor applications PLC equipment can use household electrical power wiring as a transmission medium.

In order to increase the bandwidth of PLC systems it has been proposed to use Multiple Input—Multiple Output schemes (MIMO), which are known from wireless communication.

It is an object of the invention to further increase the bandwidth of PLC systems.

The object is solved by a method, a receiver, a transmitter, a power line communication modem and a power line communication system.

Further embodiments are defined in the dependent claims.

Further details of the invention will become apparent from a consideration of the drawings and ensuing description.

BRIEF DESCRIPTION OF THE DRAWINGS

FIG. 9a shows a circuit diagram for impedance modulating devices, FIG. 9b shows a schematic diagram of the time-dependence of the voltage, when impedance modulating devices are present, FIG. 9c shows a schematic diagram of a voltage-time relation with parts of similar channel capacities to explain a further embodiment of the invention.

DETAILED DESCRIPTION

Figure 1:
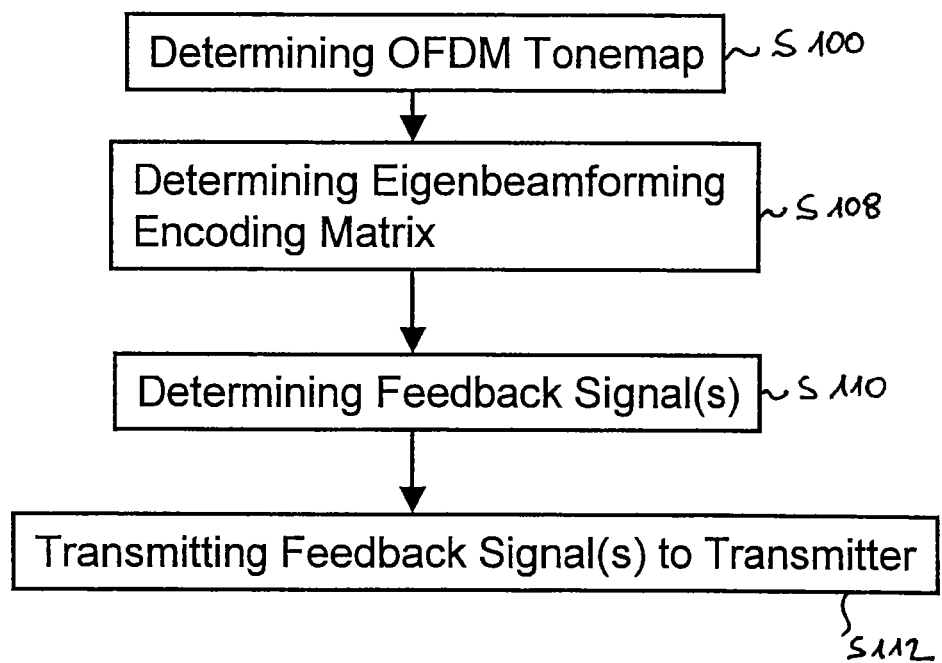
FIG. 1 shows steps of one embodiment of the invention.

In the following, embodiments of the invention are described. It is important to note that all described embodiments in the following and their properties and technical features may be combined in any way, i.e. there is no limitation that certain described embodiments, properties and technical features may not be combined with others.

In a step S100 an OFDM tonemap is derived from a channel estimation. This is done by transmitting a training sequence, which might also be referred to as a test signal. The signal is OFDM (Orthogonal Frequency Division Multiplex)—modulated, i.e. a plurality of sub-carriers is used for transmitting the training sequence. OFDM is a multi-carrier modulation scheme, which uses a large number of closely spaced orthogonal sub-carriers. Each sub-carrier is modulated with a conventional modulation scheme (such as quadrature amplitude modulation (QAM)) at a low symbol rate, maintaining data rates similar to conventional single-carrier modulation schemes in the same bandwidth. In practice, OFDM signals are generated using the Fast Fourier transform algorithm. The primary advantage of OFDM over single-carrier schemes is its ability to cope with severe channel conditions—for example, attenuation of high frequencies at a long copper wire, narrowband interference and frequency-selective fading due to multipath—without complex equalization filters. Channel equalization is simplified because OFDM may be viewed as using many slowly-modulated narrowband signals rather than one rapidly-modulated wideband signal.

Due to a multipath PLC channel, symbols of the training sequence are attenuated in a frequency selective way. A receiver evaluates the disturbed symbols of the training sequence and calculates the channel properties in a step S104. Instead of the wording "channel estimation" similar wordings like "channel conditions" or "channel properties" mainly describe the same features. Measurements which describe the channel estimation are, for instance, bit-error-rate (BER) or Signal-to-Noise-Ratio (SNR).

The OFDM tonemap describes the constellation, which can be used on the single sub carriers. Since not all sub-carriers are influenced by disturbances like noise on the channel in the same way, the modulation schemes can be different for the different sub-carriers. With increasing SNR a higher modulation scheme might be chosen. This optimizes the best possible throughput for the current channel conditions. An OFDM with adaptable modulation schemes is also referred to as "adaptive OFDM".

In a step S108 an eigenbeamforming encoding matrix is generated from the channel conditions. When using Multiple- Input-Multiple-Output (MIMO) schemes on a power line network for transmitting signals from a transmitter to a receiver, there are different MIMO approaches. With MIMO different goals can be achieved: On the one hand MIMO can obtain a capacity gain by sending different streams over different transmit ports (Spatial Multiplexing). On the other hand, MIMO can obtain a diversity gain to combat fading by sending replicas of each symbol over different transmit ports (space-time or space-frequency-codings), like in Alamouti-schemes.

From the channel estimation a channel matrix H can be derived by writing transmission coefficients hij (i: number of feeding port, j: number of receiving port) in a matrix form (here for instance for i=2 feeding ports and j=4 receiving ports):

$$H = \begin{pmatrix} h_{11} & h_{12} \\ h_{21} & h_{22} \\ h_{31} & h_{32} \\ h_{41} & h_{42} \end{pmatrix}$$

Note, due to the multipath channel the H-matrix is different for each sub-carrier in case of OFDM transmission.

The channel matrix H can be decomposed into 2 parallel and independent Single Input—Single output (SISO) branches by the help of a singular value decomposition $$H = UDV^H$$

With $$D = \begin{pmatrix} \sqrt{\lambda_1} & 0 \\ 0 & \sqrt{\lambda_2} \\ 0 & 0 \\ 0 & 0 \end{pmatrix}$$

$\lambda_i$ are the eigenvalues of the "squared" channel matrix $H \cdot H^H$. U and V are unitary matrices, i.e. $U^{-1}=U^H$ and $V^{-1}=V^H$, respectively. Upper H indicates the Hermitian operator, which is the transposed and conjugate complex (*) of a given matrix.

A channel capacity can be calculated as the sum of two independent SISO channels. For frequency selective channels, the available bandwidth is divided into N equivalent sub bands (N=number of sub-carriers):

$$C = B \frac{1}{N} \sum_{i=1}^{N} \sum_{\mu=1}^{2} \log_2 \det\left(I_{N_R} + \frac{\lambda_{i,\mu} E_S}{n_T N_0}\right) \text{bit/s}$$

With $I_{NR}$: $n_r \times n_r$ identity matrix, $n_r$: number of receiving paths, $n_t$: number of transmitting paths, B: Channel bandwidth, $E_s$: total average transmission energy, $N_0$: AWGN (Average White Gaussian Noise) Level.

For Spatial Multiplexing, 2 different symbols are sent via two transmit ports. Let $s_i$ be the vector of the 2 symbols sent on the i-th sub-carrier, then the vector of the 4 received symbols of each receiving port and i-th sub-carrier is:

$$r_i = H_i s_i$$

The sent symbol vector $s_i$ can be detected with a detection matrix $W_i$. $W_i$ can be realized by applying either a zero-forcing (ZF) algorithm or the minimum mean squared error (MMSE) algorithm. For ZF the detection matrix is the Moore-Penrose-Inverse of the channel matrix:

$$W_i = (H_i^H H_i)^{-1} H_i^H$$

Then the sent symbols can be recovered:

$$y_i = W_i H_i s_i = s_i$$

If the channel state information is available at the transmitter, Eigenbeamforming can be applied. The two transmit symbols of each sub-carrier are multiplied with the matrix $V_i$, which is derived from the single value decomposition (SVD) of the channel matrix Hi). If the detection matrix $W_i$ is taken as $W_i = U_i^H$ the decoded symbols are obtained as follows:

$$y_i = U_i^H H_i V_i s_i = U_i^H U_i D_i V_i^H V_i s_i = D_i s_i$$

Since $D_i$ is a diagonal matrix, the channel is decomposed into two parallel and independent paths.

Thus, from the channel estimation the Eigenbeamforming encoding matrix V is generated.

Step 100 and step 108 might also be performed in an exchanged order, i.e. it is not important whether the eigenbeamforming encoding matrix or the OFDM tonemap is determined first.

In a step S110 an eigenbeamforming feedback signal and a tonemap feedback signal is determined. The corresponding feedback signals comprise information about the generated Eigenbeamforming encoding matrix V and the OFDM tonemap.

Thus, a combined usage of eigenbeamforming MIMO and adaptive OFDM for bidirectional PLC systems is proposed. The combination of OFDM and eigenbeamforming MIMO is well suited for the PLC channel with its strong fading effects and quasi-static behaviour. Since in adaptive OFDM systems a feedback channel is already provided, this feedback can be easily used for transmitting an information about the eigenbeamforming encoding matrix as well. The amount of feedback can be decreased with compression schemes. Therefore, the Eigenbeamforming MIMO-scheme, which is known to be the most effective with respect to throughput, can be easily applied for PLC systems.

The eigenbeamforming feedback signal and the tonemap feedback signals are transmitted from the receiver to the transmitter in a step S112. Afterwards the transmitter generates a payload signal,—i.e. a signal that is not a test signal but a signal with information that should be transmitted to further devices in the power line network—and transmits the payload signal to the receiver.

In a further embodiment a feedback signal is generated based on the eigenbeam-forming feedback signal and the tonemap feedback signal and transmitted to the transmitter instead of separately transmitting the eigenbeamforming feedback signal and the tonemap feedback signal.

In a further embodiment the Eigenbeamforming decoding matrix is determined based on the channel estimation and payload data is decoded in the receiver based on the eigenbeamforming decoding matrix.

In order to reduce the data traffic on the power line network in a further embodiment the feedback signal is compressed prior to transmitting the feedback signal to the transmitter. The generated compressed feedback signal is then transmitted to the transmitter. Thus, the needed bandwidth can be reduced.

In a further embodiment the compression is based on a Lempel-Ziv-Markow-algorithm (LZMA), in particular an LZ77 based code. Such codes are available that are also used by current data compression methods (e.g. for zip-files) and very efficient without real-time requirements. Since changes in a channel on a power line network occur quite seldom, the PLC-channel is "quasi-static", such compression schemes are well suited for power line communication.

For MIMO channels with a more dynamic behavior in a further embodiment a compression algorithm is used, which is less time-consuming. A possible solution is a Huffmann-code. The Huffmann-code can be optimized according to the probability of the different symbols, so that symbols that are more often used get the shortest encoding sequence. In this further embodiment dynamic changing coding trees are fed back to the transmitter together with the feedback signal. Changes in the OFDM tonemap and the encoding matrix results in changing probabilities of the different symbols, a new coding tree is generated in the receiver and sent back as part of the feedback signal to the transmitter. Thus, a so-called dynamic Huffmann-code is implemented.

In a further embodiment a set of predetermined encoding matrices in is stored in the transmitter and in the receiver with corresponding identifiers of said encoding matrices. Within the receiver a representative encoding matrix from said set of predetermined encoding matrices is selected, wherein said representative encoding matrix is similar to said eigenbeamforming matrix. Afterwards only the encoding matrix index is sent back to the transmitter as part of the feedback signal and not the complete encoding matrix. A complete encoding matrix would result in a large amount of feedback data, e.g. 1000*4*16bis=64000 bits, if there are one thousand sub-carriers, 2 transmit paths used (2×2 encoding matrix), with a matrix element resolution of 16 bits. Due to the discrete set of encoding and related decoding matrices, the amount of feedback data can be reduced. The degradation due to the usage of the set of encoding matrices (instead of "perfect" encoding matrices) is sufficiently low. In this case, the receiver only sends back to the transmitter the identifier (or index) of the matrix pair that should be used for the encoding/decoding process.

Since the PLC channel is quasi-static, i.e. changes in the channel estimation or channel properties do not appear too often (e.g. by switching on a light), in a further embodiment the amount of feedback data can further be reduced. The update frequency is dependent on the frequency of changes of channel conditions. The feedback signal or the channel estimation after receiving a further disturbed training sequence are compared with the already determined channel estimation or with the already sent feedback signal, and only in cases when they differ from each other, a corresponding new feedback signal is sent back to the transmitter.

In typical PLC channels neighbored sub carriers often use the same modulation constellation resulting from the tonemap and/or the same pair of en/decoding matrices for the Eigenbeamforming MIMO. So the feedback signal can be compressed significantly by transmitting a common part of the feedback signal for sub-carriers, which exhibit similar channel conditions, which result in the same tonemap and/or the same encoding matrices.

In PLC networks often periodic or repetitive impedance changes occur due to so-called impedance modulating devices. Mobile phone chargers and other charging devices contain circuitry that change the mains impedance, depending on a line cycle duration. These periodic impedance changes have a dramatic influence to data transmission over a power line. An impedance change during a transmitted data burst results in wrong channel equalization values after the impedance changes and causes not correctable transmission errors. Therefore, a Medium Access Control (MAC) of a power line communication system tries to place the data burst in time intervals, where the impedance keeps stable. In a further embodiment of the invention time-dependent repetitive patterns of said channel estimation are determined, like the patterns resulting from said impedance modulating devices. The repetitive pattern is divided into parts in which the channel estimation remains essentially the same and the corresponding feedback signals are determined for each of the parts and transmitted back to the transmitter together with an indicator of the repetitive pattern. Such indicator describes the time-dependent behavior of the channel estimation, e.g. the frequency and number of parts of the repetitive pattern and the corresponding starting and/or end times. The transmitter uses this indicator together with corresponding feedback signals to transmit the data bursts thereby taking into account the respective channel estimation. Since the conditions on the channel are known in advance due to the periodic nature of the impedance modulation, it is not necessary to transmit the feedback signal in every case, but only in cases where there is not only such an already known repetitive behavior, but some additional effect. Thus, the amount of feedback data can further be reduced.

Figure 2:
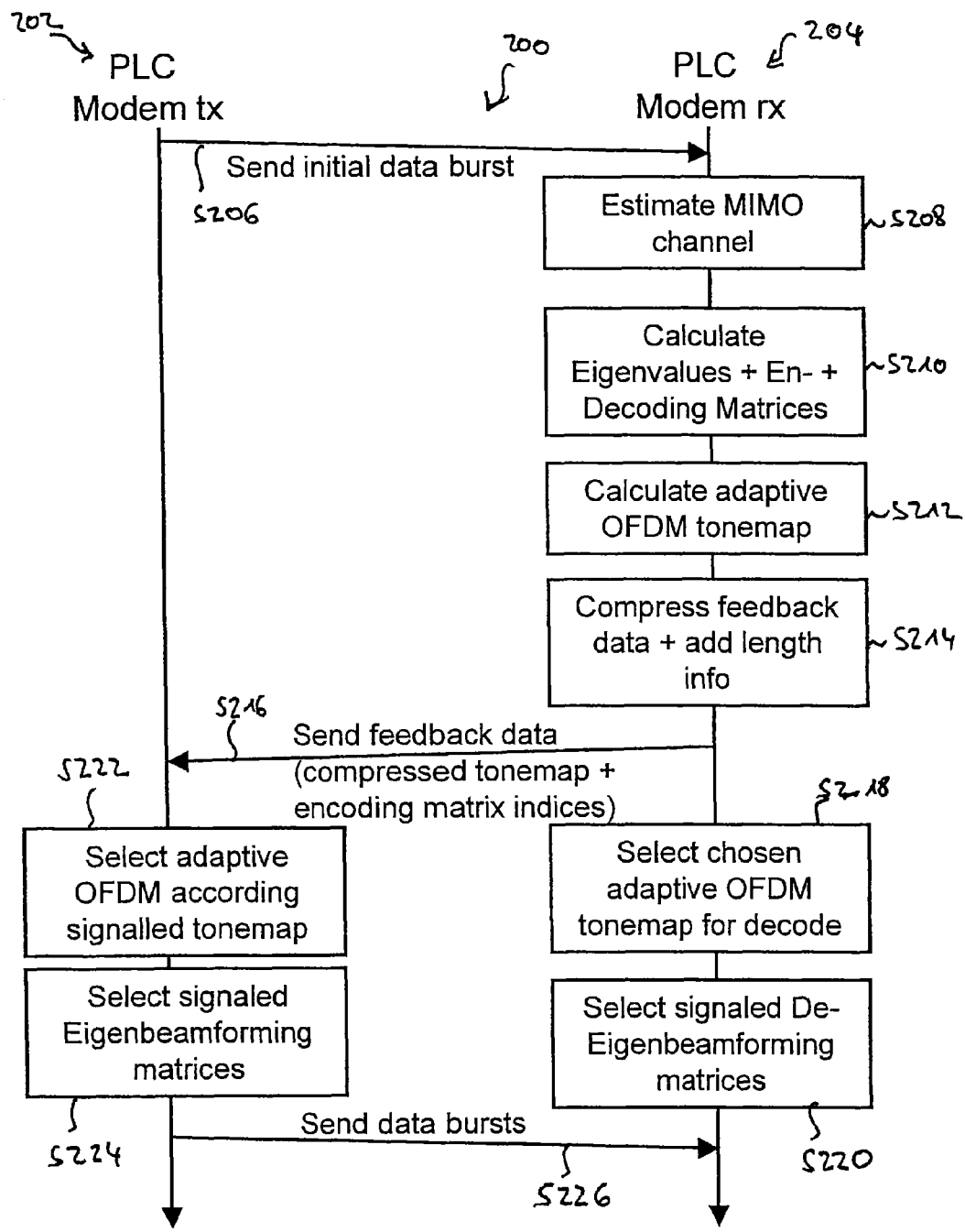
FIG. 2 shows steps of a further embodiment of the invention.

In FIG. 2 a further embodiment of the method for transmitting signals in a power line network 200 is depicted. A first or transmitting power line modem 202 is intending to transmit a message or payload to a second or receiving power line modem 204. In a step S206 an initial data burst with a training sequence is sent from the first modem 202 to the second modem 204. Within the second modem 204 the MIMO channels are estimated in a step S208. Then in a step S210 from the estimated MIMO channels eigenvalues, encoding and decoding matrices are calculated. Also in a step S212 the adaptive OFDM tonemap is calculated. Derived feedback data is compressed and a length information is added in a step S214 and the feedback data or feedback signal is send back to the transmitter in a step S216. Within the receiver 204 in a step S218 the adaptive OFDM tonemap is chosen for decoding in a step S218 and the corresponding decoding eigenbeamforming matrix is selected in step S220. Within the transmitter 202 the adaptive OFDM according to the signaled tonemap from the feedback signal is selected in a step S222 and the signaled encoding eigenbeamforming matrix is selected in a step S224. Afterwards the payload or message is built accordingly and sent as data burst to the receiver 204 in a step S226. Within the receiver 204 the OFDM tonemap and the decoding matrix are used to generate the original signal.

Figure 3A:
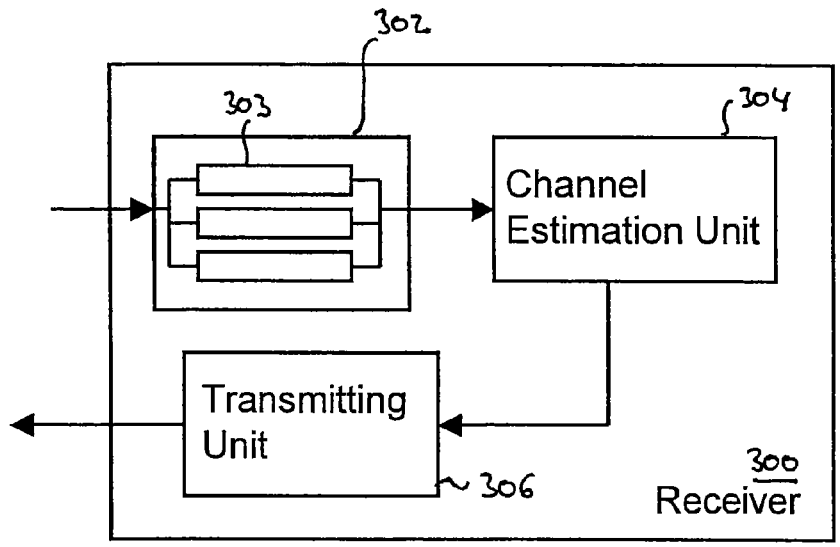
FIG. 3a, 3b show block diagrams of a receiver according to further embodiments of the invention.

A schematic block diagram of a receiver 300 according to a further embodiment of the invention is shown in FIG. 3*a*. The receiver 300 comprises a receiving unit 302, including a plurality of OFDM demodulators 303 for demodulating signals received via sub carriers of an OFDM-based signal. The receiving unit 302 is connected to a channel estimation unit 304, which is configured to estimate the characteristics of the power line network channel and is further configured to determine an OFDM tonemap and an eigenbeamforming encoding matrix based on said channel estimation for each sub carrier. A tonemap feedback signal is determined by said channel estimation unit 304, which is descriptive of said OFDM tonemap and an eigenbeamforming feedback signal is determined based on said eigenbeamforming encoding matrix. The channel estimation unit 304 is connected to a transmitting unit 306, which is configured to transmit the feedback signal to the transmitter.

In a further embodiment the channel estimation unit 304 is further configured to generate a feedback signal based on said eigenbeamforming feedback signal and said tonemap feedback signal, and said feedback signal is transmitted via the transmitting unit 306 to the transmitter.

Figure 3B:
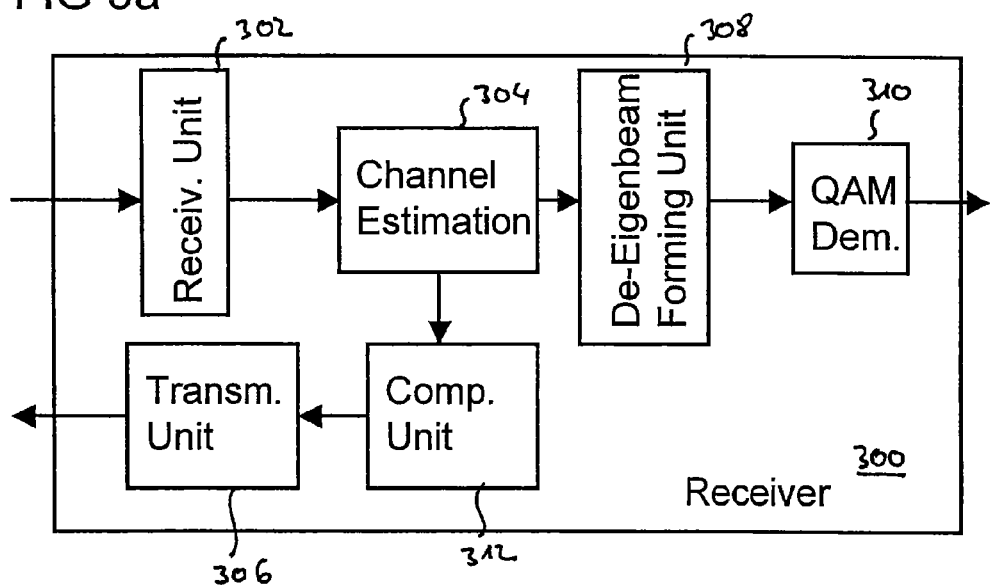

A further embodiment of a receiver 300 is depicted in FIG. 3b. Additionally the receiver comprises a de-eigenbeamforming unit 308, which is connected to the channel estimation unit 304 and a QAM-demodulation unit 310, which is connected to the de-eigenbeamforming unit 308. The de-eigenbeamforming unit 308 and the QAM-demodulation unit 310 are used to re-generate the transmitted original signal. The channel estimation unit 304 is configured to generate an eigenbeamforming decoding matrix, which corresponds to the generated eigenbeamforming encoding matrix and transmits the decoding matrix to the de-eigenbeamforming unit 308. The channel estimation unit 304 also sends the OFDM tonemap to the QAM-demodulation unit 310. In addition a compression unit 312 is connected between the channel estimation unit 304 and the transmitting unit 306. The compression unit 312 is configured to compress the feedback signal prior to transmitting it in order to reduce the bandwidth needed for the feedback.

Figure 4A:
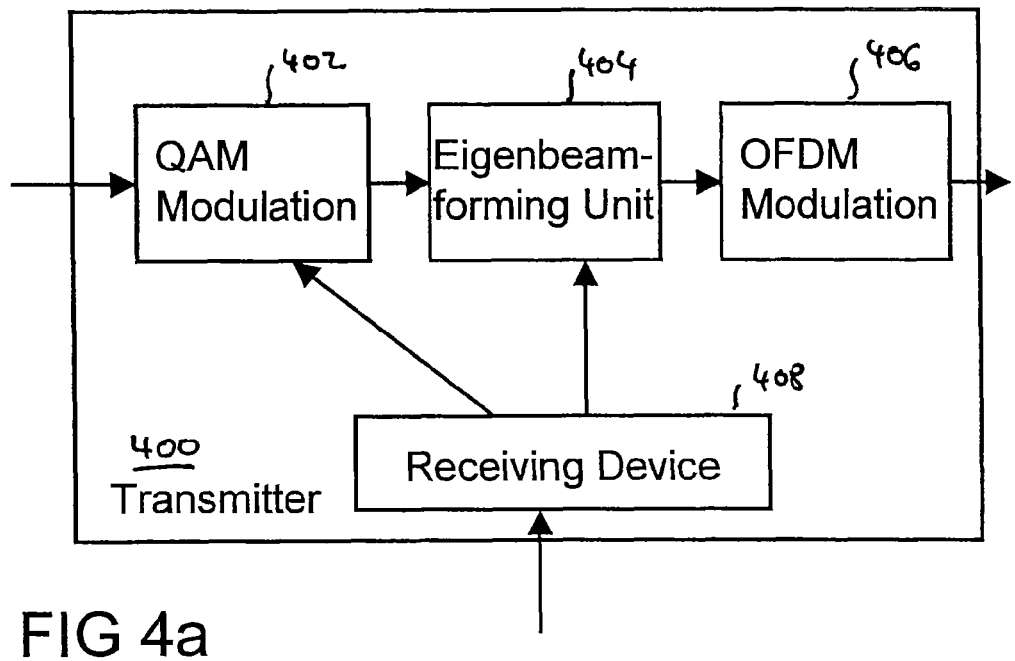
FIG. 4a, 4b show block diagrams of a transmitter according to further embodiments of the invention.

In FIG. 4a a schematic block diagram of a transmitter 400 is depicted. The transmitter comprises an adaptive QAM modulation unit 402, an eigenbeamforming unit 404, an OFDM modulation device 406 and a receiving device 408. A signal which is intended to be transmitted to a receiver is QAM modulated in the adaptive QAM modulation unit 402 according to the latest OFDM tonemap. The eigenbeamforming unit 404 is connected to the QAM modulation unit 402. Within the eigenbeamforming unit 404 the incoming symbols are multiplied with the eigenbeamforming encoding matrix and the resulting symbols are transmitted via the OFDM modulation device 406. The receiving device 408 is connected to the adaptive QAM-modulation unit 402 and to the eigenbeamforming unit 404. The receiving device 408 receives feedback data, i.e. the feedback signal from the receiver, and forwards the eigenbeamforming encoding matrix to the eigenbeamforming unit 404 and forwards the OFDM tonemap to the adaptive QAM modulation unit 402.

Figure 4B:
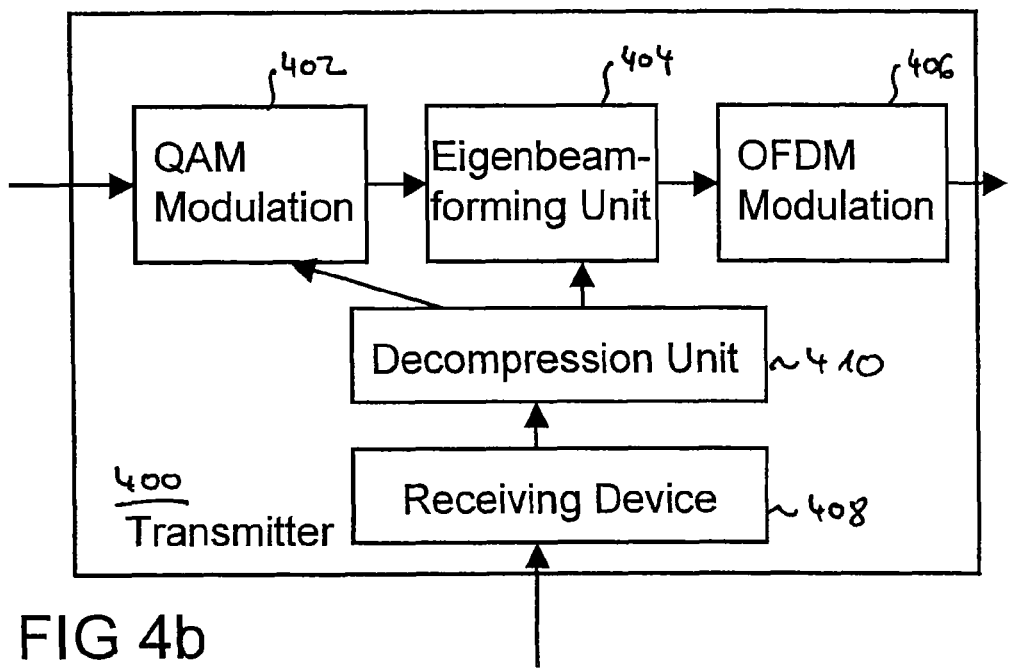

In FIG. 4b a schematic block diagram of a further embodiment of a transmitter 400 is depicted. Additionally a decompression unit 410 is connected between the receiving device 408 and the adaptive QAM modulation unit 402 and the eigenbeamforming unit 404, respectively. The decompression unit 410 is configured to decompress the feedback signal.

Figure 5:
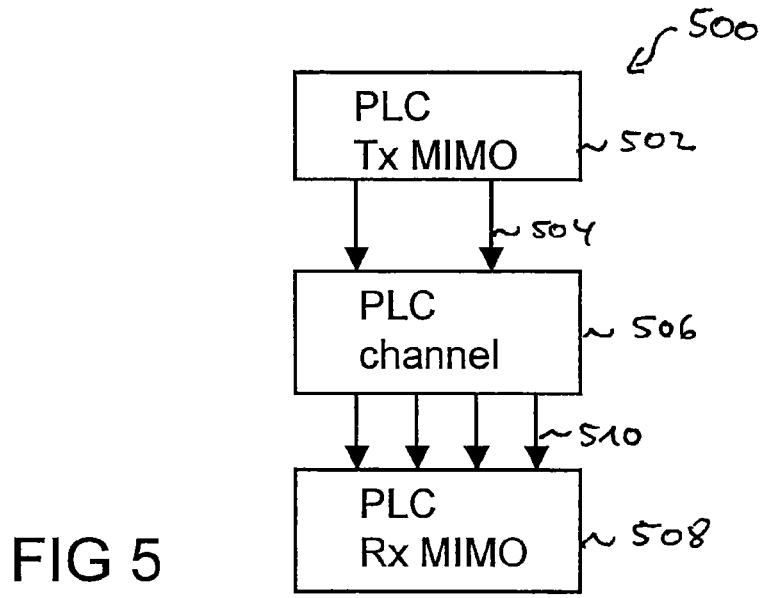
FIG. 5 shows a block diagram of a power line communication system according to a further embodiment of the invention.

A schematic block diagram of a power line communication system or power line network 500 is depicted in FIG. 5. A power line modem 502 in a transmission MIMO mode (Tx MIMO) with two transmitting paths 504 uses the channels 506 of the power line communication system 500 and a power line modem 508 in a receiving MIMO mode (Rx MIMO) receives the signal on four receiving paths 510.

The two transmission paths result from two out of three possibilities to feed signals on a home installation with three wires, i.e. phase line (P), neutral line (N) and protective earth (PE). Signals may be fed between phase and neutral (P-N), phase and protective earth (P-PE)) and neutral and protective earth (N-PE). According to Kirchhoff's rule the sum of the 3 input signals has to be equal to zero. Thus, only two out of the three possible input ports can be used. On the receiving side all three differential reception ports can be used. Additionally a common mode (CM) path can be used. Leakage current flowing between ground and earth due to AC (alternating current) primary or secondary neutral currents in the power-distribution system can produce a potential difference between the neutral and frame ground. Due to electromagnetic coupling between neighbored wires cross-talk arises, i.e. the transmit signal from any feeding port is visible on all 4 reception paths.

Figure 6:
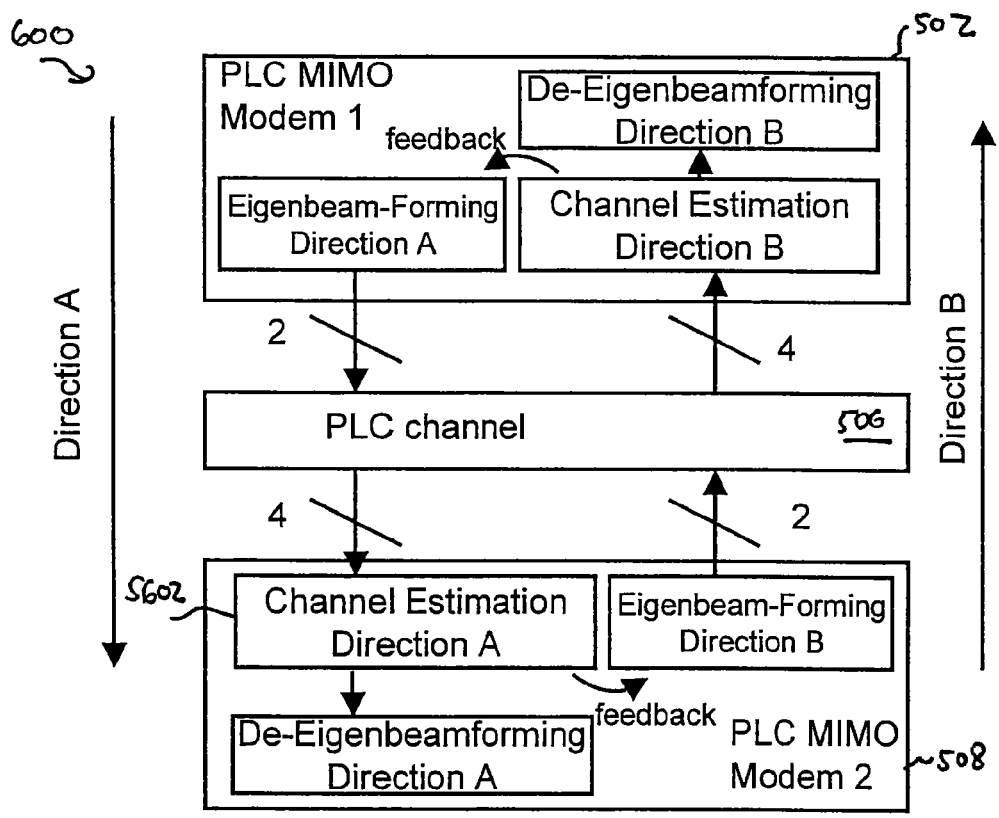
FIG. 6 shows a block diagram of a power line communication system according to a further embodiment of the invention.

In FIG. 6 a more detailed block diagram of a power line communication system 600 is depicted. The first power line modem 502 and the second power line modem 508 may comprise both the functions of the receiver and the transmitter, so that a bidirectional communication network is built. In direction A the second power line modem 508 receives data from the first power line modem 502. The receiving modem estimates the channel in a step S602, calculates the eigenbeamforming encoding and decoding matrices as well as the adaptive OFDM tonemap for this direction. Then the receiving modem maps the calculated eigenbeamforming matrices to the nearest en-/decoding matrix pair of the available set of matrices (quantization). The related matrix pair index as well as the adaptive OFDM tonemap are then processed in a way to reduce the amount of feedback data (e.g. data redundancy, compression). The compressed data is sent back from the second modem 508 to the first modem 502 over the PLC channel 506. The described procedure is performed for both directions separately. The illustrated number of wires is just for illustrating purposes. Both communication directions are separated in Time Division Multiplexing, i.e. in transmit mode the modem feeds into two differential feeding ports (three wires), while in receive mode it uses up to four receiving ports. Receive and transmit mode use of course the same set of available wires.

Figure 7:
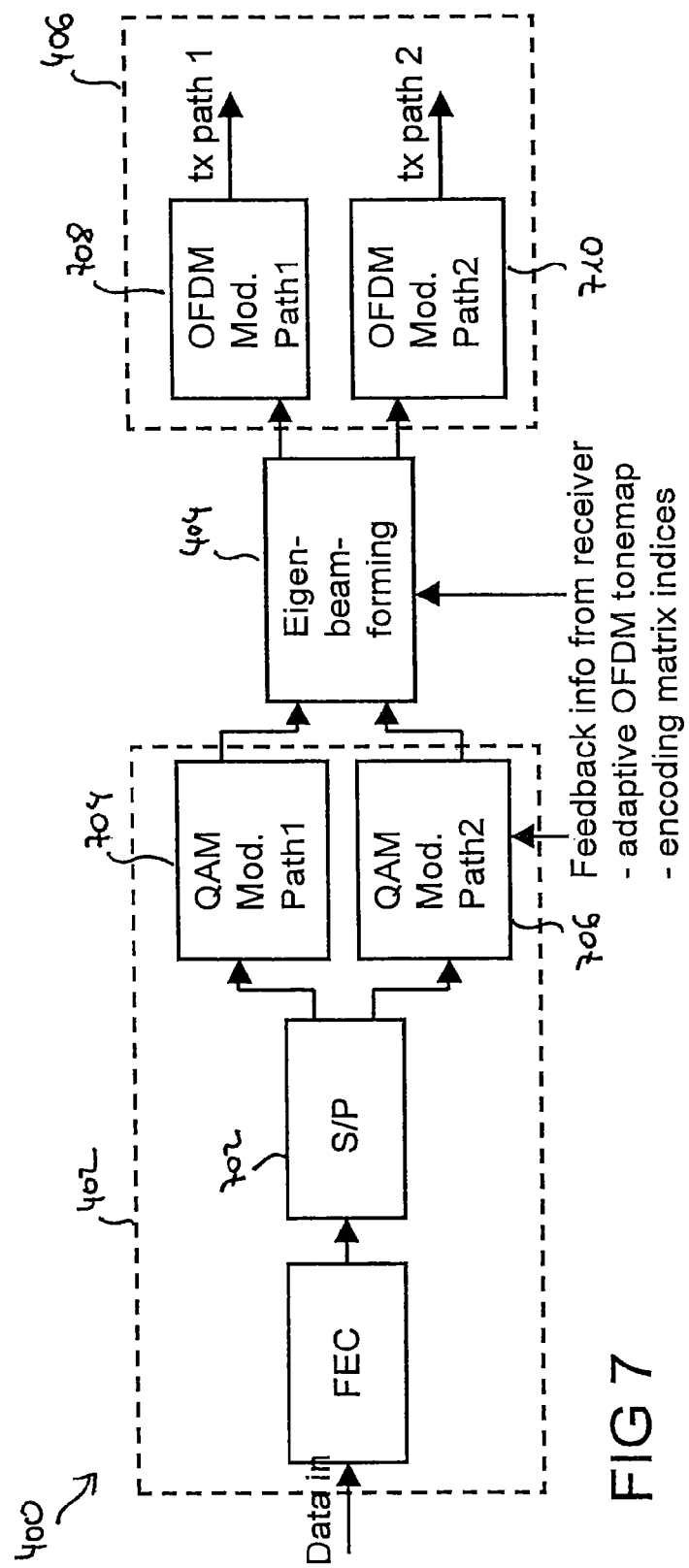
FIG. 7 shows a block diagram of a transmitter according to a further embodiment of the invention.

In FIG. 7 a more detailed block diagram is depicted for parts of a further embodiment of a transmitter 400. The incoming data (data in) is encoded from a forward error correction state FEC and fed into the different transmit paths (tx path 1, tx path 2) by a serial-to-parallel converter 702. On each path an adaptive QAM modulator 704, 706 processes the data. Afterwards the two paths enter the eigenbeamforming encoding unit 404, where the incoming adaptive QAM symbols are multiplied with the eigenbeamforming encoding matrix. The encoded symbols are fed to the OFDM modulators 708, 710 of the different transmit paths.

Figure 8:
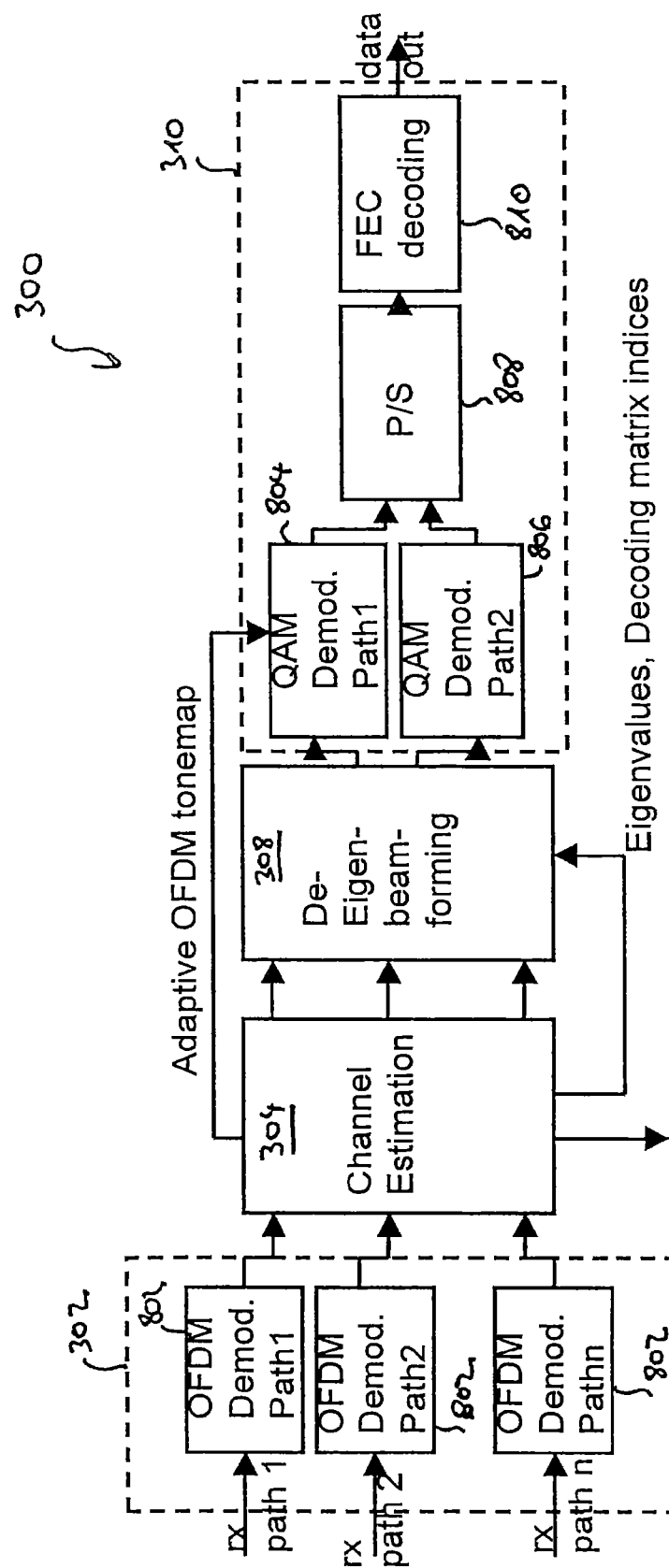
FIG. 8 shows a block diagram of a receiver according to a further embodiment of the invention.

In FIG. 8 a more detailed block diagram is depicted for parts of a further embodiment of the receiver 300. The first stage of the receiver are different OFDM demodulators 802 (e.g. up to four for the PLC system). Then a channel equalizer within the channel estimation unit 304 calculates the channel matrix of the MIMO channel. This channel matrix is used for the single value decomposition (SVD) that is used for the eigenbeamforming MIMO (eigenvalues and en-/decoding matrices). Afterwards the de-eigenbeamforming unit 308 performs matrix operations to reduce back to the two different data paths. These two paths are decoded by adaptive QAM demodulators 804, 806 before the data is assembled from a parallel-to-serial converter and a final FEC decoding stage 810 is applied.

Compared to other MIMO schemes as Alamouti or Spatial Multiplexing MIMO, Eigenbeamforming MIMO is considered as the most complex MIMO scheme. On the other side, it offers the best throughput performance.

The main difference is the need of sending feedback data from the receiver to the transmitter: For each of the OFDM sub-carriers, an encoding matrix has to be send back to the transmitter. This results in a huge amount of data. There are several possibilities to reduce the overall feedback datarate, e.g.:

a) In a dynamic channel, the feedback is needed for each burst. In static channels, the feedback information is just needed once. Regarding PLC, the channel is considered to be quasi-static. This means, feedback information is just needed if there's a (seldom) change in the channel behavior.

b) If several neighbored sub-carriers have the same channel characteristic, the system can bundle encoding matrix information rather than sending back matrix information for each sub-carrier.

c) One common set of pre-selected en-/decoding matrices is shared by all sub-carriers: This is a fundamental method to reduce the data: Not the matrix data itself is send back to the transmitter but the index of the en-/decoding matrix that should be used. Since the encoding process on transmitter side is just a phase rotation, the degradation due to the usage of a set of encoding matrices (instead of the 'perfect' encoding matrices) is sufficiently low.

In addition to the Eigenbeamforming MIMO, adaptive OFDM needs the feedback of the sub-carrier modulation from the receiver to the transmitter. Upper points a) and b) can be also applied to adaptive OFDM: The sub-carrier modulation information is not needed for every sub-carrier and only if there's a significant change in the channel characteristics.

Therefore, the combination of adaptive OFDM and Eigenbeamforming MIMO is well chosen for the PLC channel with its strong fading effects and quasistatic behavior. Since in case of an adaptive OFDM a feedback of a tonemap is already used, the additional feedback for the Eigenbeamforming encoding matrix may be easily implemented.

FIG. 9a shows a circuit diagram and FIG. 9b shows the corresponding time-dependence of the voltage Ua on a power line, if impedance modulating devices are present. Mobile phone chargers and other charging devices contain this circuity that has the following properties:

If the capacity C charges, HF-signals from Mains are shortcut,

If the diode is blocking, the rectifier has a high input impedance,

So the mains impedance changes at least twice within the line cycle duration.

The periodic impedance changes have dramatic influence to data transmission over power line. An impedance change during a data burst results in wrong channel equalization values after the impedance change and causes non-correctable transmission errors. Therefore it is important to place the burst in time intervals where the impedance keeps stable, which is a task for a medium access control (MAC) layer of a power line communication system.

In FIG. 9c it is depicted that depending on the line cycle frequency, different channel conditions result in different sets of en-/decoding matrices (in this example: two different channel conditions, but more different channel conditions might be possible as well). The y-axis represents the voltage of an AC line cycle.

By default, the complete information exchange has to be repeated for each impedance change of the channel. Within this embodiment of the invention in presence of impedance modulating devices the feedback process is performed separately for each impedance condition:

Since the channel characteristics 'toggle' in a discrete way between several condition sets (depending on the line cycle frequency and the number of impedance modulating devices in the network), the receiver and transmitter provide several sets of en-/decoding matrices that match to the different available channel conditions. The MAC is responsible for placing the data bursts completely within one phase without channel changes. Therefore it is also within the responsibility of the MAC to tell the receiver/transmitter which set of en-/decoding matrices should be used for the Eigenbeamforming processing.

The proposed scheme can be used for all repetitive channel conditions (not only for impedance modulating devices). The proposed compression scheme for data reduction is applied to each feedback process separately.

Figure 10:
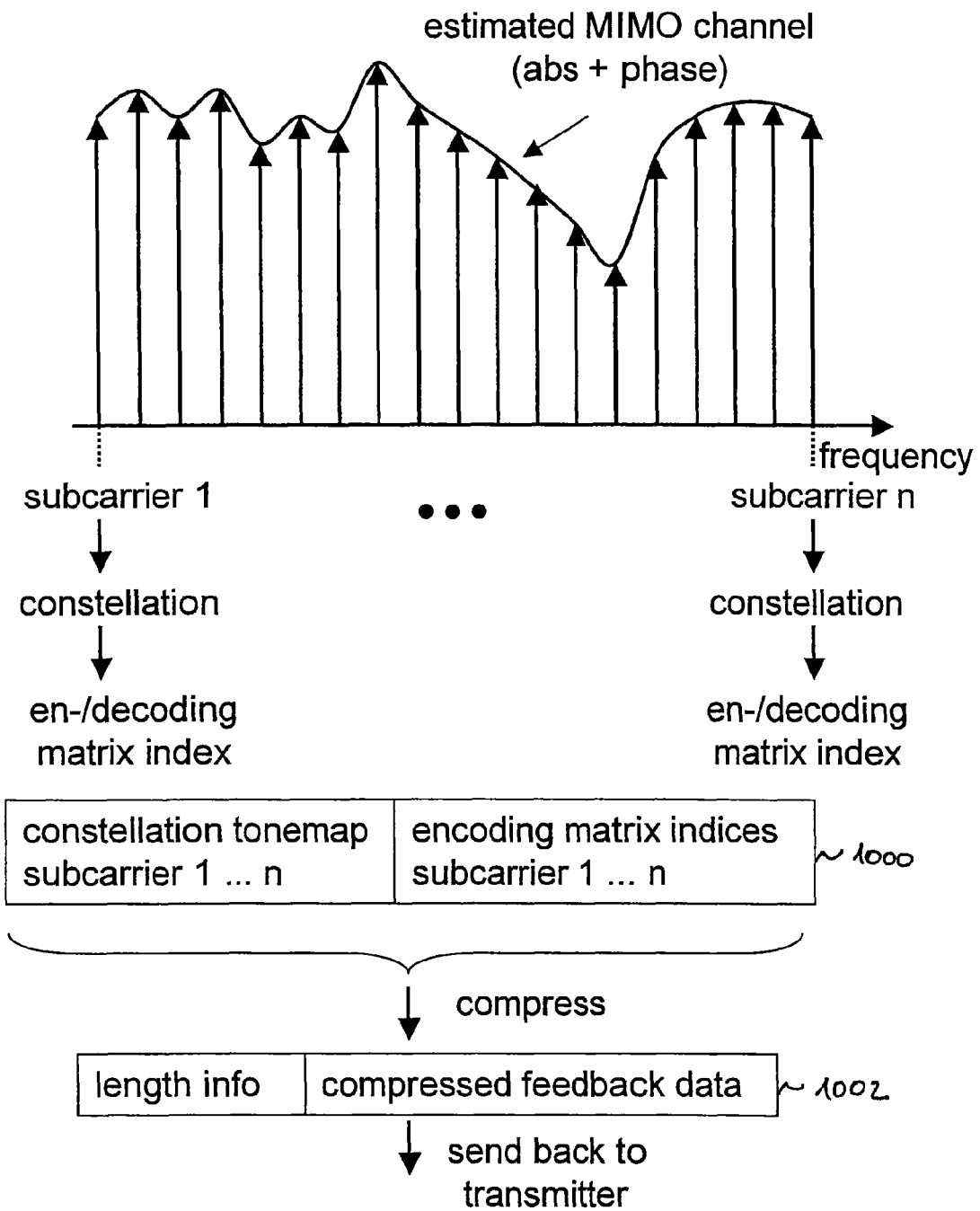
FIG. 10 shows a schematic diagram of building a feedback signal according to a further embodiment of the invention.

In FIG. 10 the building of the feedback signal is depicted schematically. At the top for a plurality of sub-carriers $1 \ldots n$ the channel is estimated, resulting in different channel conditions for the respective sub-carriers, which is shown schematically by the different lengths of the arrows. For each sub-carrier a constellation is chosen according to its current SNR value (the tonemap is the set of all sub-carrier modulation indices). In addition, the related en-/decoding matrices for the eigenbeamforming are calculated. For the encoding and decoding matrices the respective indices are selected from a predetermined set of matrices. A feedback signal 1000 is generated from the constellation tonemap and from the matrix indices for the sub-carriers. The feedback signal is compressed and a compressed feedback signal 1002 is obtained and prefixed with its length information. The compressed feedback signal 1002 is sent back to the transmitter.

Data compression algorithms for the feedback data are used in order to reduce the overall amount of data for each information feedback transfer. The compressed feedback information is expected to be very effective since the feedback data shows often repetitive data patterns: Neighbored (or even many neighbored) sub-carriers have the same selection on sub-carrier constellation and en-/decoding matrices for the Eigenbeamforming processing. Repetitive data patterns or data patterns with long constant symbol chains are most effective for compression patterns.

As mentioned, the PLC channel shows a quasistatic behavior: Changes in the channel characteristic occur quite seldom. In this case, an efficient compression mechanism without real time requirements can be applied. For the quasistatic PLC channel, state of the art LZ 77 based codes can be chosen for (de-) compression.

As an example, Lempel-Ziv-Markow-algorithms could be applied, that are public available compression schemes that are also used by current data compression methods (e.g. zip).

The receiver compresses the tonemap and the encoding matrix indices, add a length prefix and sends it as feedback data back to the transmitter (described below).

For MIMO channels with a more dynamic behavior the decoding of Lempel-Ziv-Markow-algorithms might be too time consuming. In this case an algorithm that is more applicable to continuous data flows can be used. One possible solution is the usage of codes like the Huffmann codes, as it is used in many digital standards.

In addition, the Huffmann encoding can be optimized according to the probability of the different symbols—the idea is that symbols that are used most often get the shortest encoding sequence.

In this case dynamic changing coding trees are fed back to the transmitter: Changes in the tonemap and the encoding matrix indices results in changing probabilities of the different symbols, a new coding tree is created in the receiver and must be sent as part of the feedback data back to the transmitter.

Thus, a combined usage of eigenbeamforming MIMO and adaptive OFDM for bidirectional PLC systems is proposed. The combination of OFDM and eigenbeamforming MIMO is well suited for the PLC channel with its strong fading effects and quasi-static behaviour. Since in adaptive OFDM systems a feedback channel is already provided, this feedback can be easily used for transmitting an information about the eigenbeamforming encoding matrix as well. The amount of feedback can be decreased with compression schemes. Therefore, the Eigenbeamforming MIMO-scheme, which is known to be the most effective with respect to throughput, can be easily applied for PLC systems.

The invention claimed is:

1. A transmitter to transmit signals over a wired network to a receiver, the wired network including at least phase, neutral and protective earth wires so that the network establishes multiple wired transmission paths, the transmitter comprising:
an adaptive mapping circuit configured to map bits to a plurality of sub-carriers in accordance with constellation information for the respective sub-carriers;
an eigenbeamforming circuit configured to eigenbeamform an output of the adaptive mapping circuit using eigenbeamforming information;
an orthogonal frequency-division multiplexing (OFDM) modulation circuit configured to OFDM modulate an output of the eigenbeamforming circuit; and
a receiving circuit configured to receive feedback information descriptive of the constellation information and the eigenbeamforming information from the receiver via the wired network, wherein the feedback information depends on channel conditions of at least two wired transmission paths established by the wired network, wherein
the adaptive mapping circuit includes first and second quadrature amplitude modulation (QAM) modulators,
the first QAM modulator is configured to map bits to a plurality of sub-carriers in accordance with first constellation information for the respective sub-carriers, the first constellation information depending on channel conditions of a first one of the at least two wired transmission paths, and
the second QAM modulator is configured to map bits to a plurality of sub-carriers in accordance with second constellation information for the respective sub-carriers, the second constellation information depending on channel conditions of a second one of the at least two wired transmission paths.

2. The transmitter of claim 1, further comprising:
a decompression circuit configured to decompress the feedback information.

3. The transmitter of claim 2, wherein the decompression circuit is configured to decompress the feedback information based on a Lempel-Ziv-Markov-algorithm based on an LZ77 based code.

4. The transmitter of claim 3, wherein the decompression circuit is configured to decompress the feedback information based on a Huffmann-code.

5. The transmitter of claim 4, wherein a Huffmann-code optimized coding tree is included in the feedback information and based on probabilities of symbols that are expected to be used within the constellation information and the eigenbeamforming information.

6. The transmitter of claim 2, wherein the decompression circuit is configured to extract length information encoded in the feedback information.

7. The transmitter of claim 1, wherein the feedback information is common for different sub-carriers when the eigenbeamforming information for each of the different sub-carriers is the same.

8. The transmitter of claim 1, wherein the feedback information is common for different sub-carriers when the constellation information for each of the different sub-carriers is the same.

9. The transmitter of claim 1, further comprising:
a storage circuit configured to store a set of predetermined eigenbeamforming information, wherein the feedback information includes an identifier identifying one of the set of predetermined eigenbeamforming information that matches the channel conditions, wherein
the eigenbeamforming circuit is configured to eigenbeamform the output of the adaptive mapping circuit using the one of the set of predetermined eigenbeamforming information that is identified by the identifier.

10. The transmitter of claim 9, wherein the set of eigenbeamforming information is a set of eigenbeamforming encoding matrices.

11. The transmitter of claim 1, wherein the channel conditions are based on a bit-error-rate or a signal-to-noise-ratio.

12. The transmitter of claim 1, wherein the constellation information is an OFDM tonemap.

13. The transmitter of claim 1, wherein the eigenbeamforming information is an eigenbeamforming matrix.

14. A transmitter for transmitting signals over a wired network to a receiver, the wired network including at least phase, neutral and protective earth wires so that the network establishes multiple wired transmission paths, the transmitter comprising:
adaptive mapping means for mapping bits to a plurality of sub-carriers in accordance with constellation information for the respective sub-carriers;
eigenbeamforming means for eigenbeamforming an output of the adaptive mapping circuit using eigenbeamforming information;
orthogonal frequency-division multiplexing (OFDM) modulation means for OFDM modulating an output of the eigenbeamforming means; and
receiving means for receiving feedback information descriptive of the constellation information and the eigenbeamforming information from the receiver via the wired network, wherein the feedback information depends on channel conditions of at least two wired transmission paths established by the wired network, wherein
the adaptive mapping means includes first and second quadrature amplitude modulation (QAM) modulating means,
the first QAM modulating means maps bits to a plurality of sub-carriers in accordance with first constellation information for the respective sub-carriers, the first constellation information depending on channel conditions of a first one of the at least two wired transmission paths, and
the second QAM modulating means maps bits to a plurality of sub-carriers in accordance with second constellation information for the respective sub-carriers, the second constellation information depending on channel conditions of a second one of the at least two wired transmission paths.

15. A method for transmitting signals over a wired network between a transmitter and a receiver, the wired network including at least phase, neutral and protective earth wires so that the network establishes multiple wired transmission paths, the method comprising:
adaptively mapping bits to a plurality of sub-carriers in accordance with constellation information for the respective sub-carriers;
eigenbeamforming an output of the adaptive mapping circuit using eigenbeamforming information;
orthogonal frequency-division multiplexing (OFDM) modulating an output of the eigenbeamforming; and receiving feedback information descriptive of the constellation information and the eigenbeamforming information from the receiver via the wired network, wherein the feedback information depends on channel conditions of at least two wired transmission paths established by the wired network, wherein the adaptively mapping includes first and second quadrature amplitude modulation (QAM) modulating, the first QAM modulating includes mapping bits to a plurality of sub-carriers in accordance with first constellation information for the respective sub-carriers, the first constellation information depending on channel conditions of a first one of the at least two wired transmission paths, and the second QAM modulating includes mapping bits to a plurality of sub-carriers in accordance with second constellation information for the respective sub-carriers, the second constellation information depending on channel conditions of a second one of the at least two wired transmission paths.

* * * * *